May 20, 1958  J. R. GUILDFORD  2,835,467
MOUNTING FEATURES OF SHEET METAL DAMPER BLADES
USED IN AIR CONDITIONING SYSTEMS

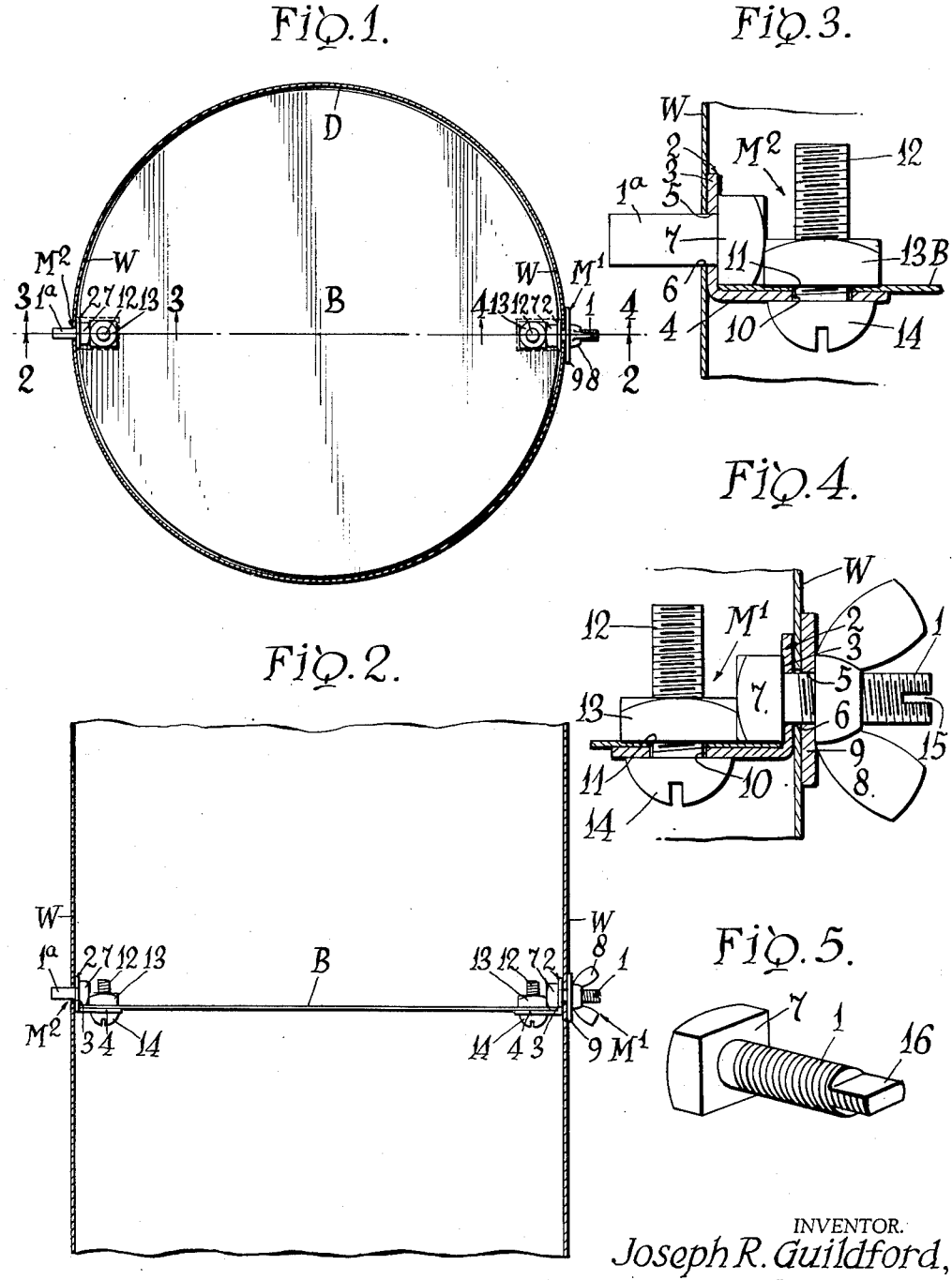

Filed May 13, 1957  2 Sheets-Sheet 2

INVENTOR.
Joseph R. Guildford,
BY
Johns Powers
ATTORNEY.

United States Patent Office 2,835,467
Patented May 20, 1958

2,835,467

MOUNTING FEATURES OF SHEET METAL DAMPER BLADES USED IN AIR CONDITIONING SYSTEMS

Joseph R. Guildford, Buffalo, N. Y.

Application May 13, 1957, Serial No. 658,852

3 Claims. (Cl. 251—89)

This invention relates to improvements in the mounting features of damper blades used in air conditioning and ventilating systems.

In such systems the branch ducts are made of sheet metal and severally require dampers for the regulation of the quantity of air delivered into the room or space. The ducts are either circular or rectangular in cross section, according to the engineer's choice. The systems fall broadly under two classes, viz., (1) a low velocity system in which the pressure of the air is comparatively slight and the air flows with a velocity of the order of 600 feet per minute and (2) a high velocity system in which the air under substantially greater pressure flows at a velocity of 1500 feet or upwards per minute. The low velocity systems are used in relatively small buildings where the space occupied by the ducts is not an item of importance. The high belocity systems are required for buildings of "skyscraper" height in which limiting the space occupied by the ducts is quite important. Hence, in the low velocity systems the ducts are usually of relatively large diameter or width, e. g., in excess of six inches, and in the high velocity systems the ducts are of smaller diameters or widths, in actual practice having a minimal limit of the order of three and three one-quarter inches, the demand presently unsatisfied being for ducts of substantially less diameter.

The dampers are sheet metal blades pivotally supported from one or two opposite walls of the duct. In fitting the damper blades in the duct section the tinsmith, either at the factory or on the job, is required in an overall operation to connect the mounting feature or features to the blade and to assemble the blade in the duct. This work has always been difficult, laborious and time consuming, and proportionately and substantially expensive. In actual practice the mounting features are usually riveted to the sheet metal blade and the blade with the mounting features attached is inserted into the duct section whereupon the mounting features are journalled in the walls of the duct, this operation requiring a movably mounted trunnion and a spring for engaging such trunnion in journalled relation in the adjacent wall of the duct. Various mounting features requiring assembly in an overall operation with reference to the damper blade and the walls of the duct section have been proposed but have the objections of being unduly intrinsically expensive, undully complicated from a mechanical and manufacturing standpoint, and involving an undue amount of time, work, and effort for installation, their principal recommendation being that they avoid the necessity of riveting.

The objects of the invention are: (1) to provide a mouting feature for damper blades which is connected to the blade without riveting and in a manner such that the connections have permanence and rigidity comparable with riveted connections; (2) to provide a mounting feature which may be quickly and readily assembled relatively to the blade and a wall of the duct; (3) which occupies extremely small space in relation to the area of the blade and therefore is not only available for ducts of minimum diameter as currently used in high velocity systems but for ducts of as small diameter as two inches, thereby to meet the demand of the industry for the reduction of the diameter of the ducts required for high velocity systems; and (4) which as to components and manner of assembly, will be of extremely simple and economical structural character.

With the above objects in view the mounting feature which constitutes the invention includes a bracket of angular section for attachment to the blade. The bracket has an element which extends between the edge of the blade and the adjacent wall of the duct and is provided with an opening for a trunnion in the form of a headed pin, the shank of the pin extending through an opening in a wall of the duct and the head being flat sided with one flat side bearing upon the blade, the trunnion being threaded for cooperation with a securing nut arranged externally of the duct. Each bracket has a second element bearing upon an adjacent face of the blade and connected to the blade in a supporting function. The mounting feature includes screw and nut connections for the attachment of the blade to the supporting element of the bracket, this element having an opening for the shank of the screw which also passes through an opening in the blade, the head of the screw bearing upon the supporting element and the nut bearing against the blade with a flat side in engagement with the head of the adjacent trunnion. The nut positively holds the trunnion against axial displacement and the head of the trunnion positively holds the nut against turning on the screw, the trunnion head and nut cooperating in a mutual locking action.

For a small range of widths or diameters of the ducts in low velocity systems, that is to say not exceeding six inches, a single mounting feature, including the above mentioned threaded trunnion, is sufficient. For the ducts of high velocity systems or the ducts of greater widths or diameters of low velocity systems the invention includes the combination of two mounting features located at diametrically opposite points, one having the threaded trunnion above mentioned and the other having a plain or unthreaded trunnion.

Where two oppositely located mounting features are required the bracket which carries the threaded trunnion is attached to the blade outside of the duct and the blade is then introduced into the duct and manipulated to effect the insertion of the threaded trunnion through the opening in one of the walls of the duct, the openings in the opposed walls being in alinement. The securing nut is then fitted upon the threaded trunnion and is advanced to hold the blade in a plane normal to the planes of the opposite walls. The second bracket is thereupon positioned in the duct adjacent the wall from which it is to be supported and the unthreaded trunnion is inserted through the alining openings in the bracket and in the wall and serves to support the bracket, the second element of the bracket engaging the blade in supporting relation. The screw and nut connections of the second bracket are then applied. In applying the screw and nut connections of each bracket the nut is held manually against turning movement and the screw is rotated to feed the nut toward the blade, the nut being held captive, i. e., against rotation, by the bearing of one of its flat sides against the adjacent trunnion head. The turning of the screw is continued until the nut bears against the adjacent face of the blade. The securing nut on the threaded trunnion is thereafter tightened to hold the blade in the position which is determined after a test run of the system.

In the drawings:

Figure 1 is a horizontal sectional view showing a blade of circular outline as mounted in a duct of circular cross section, the blade being shown in its closed position.

Figure 2 is a vertical sectional view in the diametrical plane 2—2 of Figure 1.

Figure 3 is a fragmentary vertical sectional view in the plane 3—3 of Figure 1.

Figure 4 is a fragmentary vertical sectional view in the plane 4—4 of Figure 1.

Figure 5 is a perspective view showing an alternative form of threaded trunnion.

Figure 7:
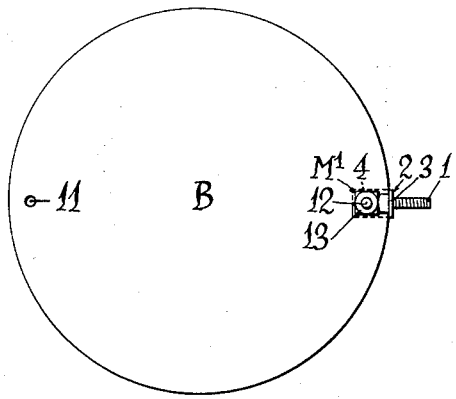
Figure 7 is an elevation of a circular blade with one of the brackets attached.
Figure 8:
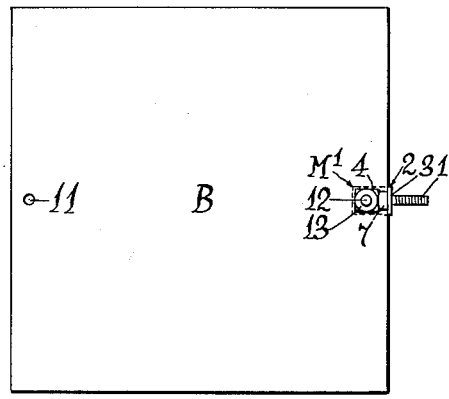
Figure 8 is an elevation of a rectangular blade with one of the brackets attached.

Referring to Figures 1 through 7:

The invention is applicable to ducts of either circular or rectangular cross section, a duct D of circular cross-section and a damper blade B of conforming diametrical dimension and disc outline being selected for illustration. These figures show the blade in closed position and as mounted at diametrically opposite points in accordance with the requirement of high velocity systems or of low velocity systems in which the ducts have a diameter or width in excess of six inches.

The oppositely located mounting features are designated generally and respectively as M-1 and M-2 and are similar in all respects except that the feature M-1 includes a threaded trunnion 1 and the feature M-2 includes an unthreaded trunnion 1a.

Each mounting feature is an assembly of elements involving a bracket 2 (Figure 6) for support by means of its trunnion from a wall of the duct and serving functionally for the support of the blade B. The bracket 2 is of angular section and includes an arm or member 3 for its support and an arm or member 4 for the support of the blade. The arm 2 extends through the space between the edge of the blade and the duct wall from which the bracket is supported and bears against and is parallel to the wall. The arm 4 is parallel to the blade and bears against one face thereof. Where two mounting features are used the brackets are of similar form and dimensions and the arms 4 bear against the same face of the blade. In Figures 1 through 4 a vertical duct is assumed and the blade in the closed position in which it is shown occupies a horizontal plane. In this position of the blade the arm 3 extends upward from the arm 4 and the arm 4 adjoins the underface of the blade. As a matter of brevity and convenience, but without limitation thereby, the arms 3 and 4 may be called the vertical and horizontal arms of the bracket.

The vertical arm 3 is formed with an opening 5 for alinement with an opening 6 in the adjacent duct wall W. The trunnion is formed with a flat sided, preferably rectangular, head 7 which when the trunnion is fully inserted through the openings 5 and 6 bears against the arm 3 and with one of its flat sides bears against the blade. The threaded trunnion 1 carries a securing nut 8 arranged externally of the duct and preferably in the form of a wing nut, a washer 9 being preferably provided to take the thrust of the nut 8 when it is fully tightened and to bear against the outer face of the wall. The horizontal arm 4 is formed at a point suitably inward of the associated trunnion head 7 with an opening 10 for alinement with an opening 11 in the blade.

The blade is rigidly attached to the arm 4 by connections which include a screw 12 and a flat sided, preferably rectangular, nut 13. In the attached relation of the blade the screw head 14 bears against the arm 4 and the nut 13 bears against the blade and with one of its flat sides bears against the trunnion head 7. The nut 13 by reason of its bearing upon the trunnion head 7 holds the trunnion against inward displacement in the direction of its axis and the head 7 by reason of its bearing against a flat side of the nut 13 holds the nut against turning movement on the screw 12. The trunnion head 7 and the nut 13 thus cooperate in a mutual locking action.

Figures 1 and 2 show the blade and mounting features completely assembled in the duct and the nut 8 tightened to hold the blade against movement. When the angular position of the blade is to be changed the nut 8 is backed off to permit free turning movement of the trunnions and the trunnion 1 is utilized as a shaft to turn the blade, the turning movement of the trunnion being transmitted to the blade by reason of the bearing of a flat side of the head 7 against the blade. In Figure 4 the trunnion 1 is shown as having a recess 15 in its free end to accommodate the end of a screw driver or similar implement by which it may be turned. The alternative form of threaded trunnion shown in Figure 5 has at its free end a reduced flat sided extension 16 to accommodate a key by which it may be turned. The angular position of the recess 15 or the extension 16 corresponds to the angular position of the blade in the duct and is therefore indicative of the particular setting of the blade.

In the attachment of the blade to the arm 4 the screw 12 is inserted through the openings 10 and 11 and the nut 13 is turned upon the screw to an extent which will effect its secure association. Thereupon the nut is held with the fingers in a position in which one of its flat sides is parallel to the inner face of the trunnion head 7. With the nut so held the screw is turned to feed the nut inward, that is to say toward the blade. When the nut reaches a position in which the flat side overlaps the inner face of the trunnion head 7 the finger grip is released and, the turning of the screw being continued, the nut is moved until it bears upon the blade and clamps the blade against the arm 4, the nut in such movement being held against turning by the associated trunnion head.

Figure 9:
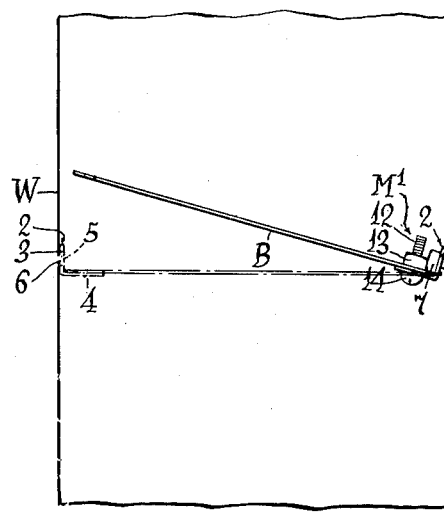
Figures 9 and 10 are diagrammatic vertical sectional views showing the steps involved in fitting and securing the blade, either of circular or rectangular form, in the duct.
Figure 10:
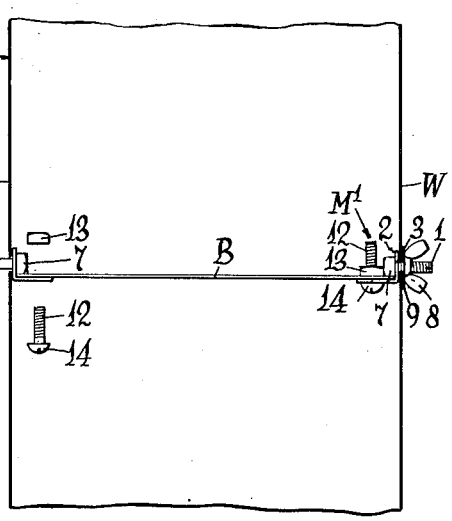
Figure 6:
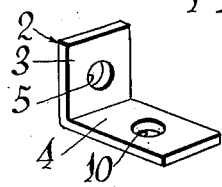
Figure 6 is a perspective view of one of the angular brackets, the second bracket being of similar form.

For blades which require support at diametrically opposite points the recommended practice for setting them in the ducts is shown in Figures 9 and 10. The mounting feature M-1 is applied to the blade outside the duct and thereupon the blade is inserted into the duct in a canted position (Figure 9) and is manipulated to effect the insertion of the threaded trunnion 1 through the wall opening 6 whereupon the wing nut 8 is tightened on the trunnion 1 in order to hold the blade in a plane substantially normal to the supporting walls W as shown in dot and dash lines. The bracket 2 of the mounting feature M-2 is then moved manually along the opposite duct wall to the broken line position shown in Figure 9 in which its arm 3 extends between the edge of the blade and the duct wall with its opening 5 registering with the wall opening 6 and its arm 4 bears against the blade (Figure 10). The unthreaded trunnion 1a is then inserted through the alining openings 5 and 6, its head 7 engaging the blade. The screw and nut connections 12 and 13 of the mounting feature M-2 are then applied in the manner above explained and as sufficiently indicated in Figure 10. The wing nut 8 is then backed off sufficiently to permit the damper to be turned. When the normal use position of the damper has been determined by a test run of the system the wing nut 8 is tightened to hold the damper in such position.

For blades which require support by only one wall of the duct the mounting feature M-1 is used and is attached to the blade outside of the duct. The blade is then introduced into the duct and its threaded trunnion inserted through the wall opening 6 in the manner shown in Figure 9. The wing nut 8 is then turned upon the threaded trunnion only to a point which will permit the damper to be turned. When the normal use position of the damper has been determined by a test run of the system the wing nut 8 is tightened to hold the damper in such position.

I claim:

1. The combination with a duct of an air conditioning system and a sheet metal damper blade having a determined angular position of use in the duct of a mounting feature for the support of the damper blade comprising a bracket of angular form having a vertical arm and a horizontal arm, the vertical arm extending between the edge of the blade and a supporting wall of the duct and having an opening for registry with an opening in the wall, a trunnion extending through the registering openings and have at its inner end a head which bears against the vertical arm and one face of the blade, the horizontal arm bearing against the opposite face of the blade and having an opening located inwardly of the head of the trunnion, the blade having an opening to register with the opening in the horizontal arm, a screw inserted through the registering openings in the horizontal arm and the blade with its head bearing against the horizontal arm and a nut fitted upon the screw for clamping the blade upon the horizontal arm, the nut being flat sided with one of its flat sides bearing against the inner face of the head of the trunnion.

2. In the combination set forth in claim 1 a mounting feature wherein the trunnion is threaded and an externally located securing nut is mounted on the threaded trunnion for cooperation with the wall by which the bracket is supported in holding the damper blade in any determined angular position.

3. The combination with a duct of an air conditioning system and a sheet metal damper blade requiring support from opposed walls of the duct and having a determined angular position of use of a pair of mounting features, each supported from one of the opposed walls of the duct and each consisting of an assembly comprising a bracket of angular form having a vertical arm and a horizontal arm, the vertical arm extending between the edge of the blade and a supporting wall of the duct and having an opening for registry with an opening in the wall, a trunnion extending through the registering openings and having at its inner end a head which bears against the vertical arm and one face of the blade, the horizontal arm bearing against the opposite face of the blade and having an opening located inwardly of the head of the trunnion, the blade having an opening to register with the opening in the horizontal arm, a screw inserted through the registering openings in the horizontal arm and the blade with its head bearing against the horizontal arm and a nut fitted upon the screw for clamping the blade upon the horizontal arm, the nut being flat sided with one of its flat sides bearing against the inner face of the head of the trunnion; one of the trunnions being threaded; and a securing nut mounted on the threaded trunnion for cooperation with the adjacent wall in holding the damper blade in any determined angular position.

No references cited.

UNITED STATES PATENT OFFICE
CERTIFICATE OF CORRECTION

May 20, 1958

Patent No. 2,835,467

Joseph R. Guildford

It is hereby certified that error appears in the printed specification of the above numbered patent requiring correction and that the said Letters Patent should read as corrected below.

Column 3, line 45, for "The arm 2 extends" read -- The arm 3 extends --; column 5, line 15, for "have" read -- having --.

Signed and sealed this 8th day of July 1958.

(SEAL)

Attest:
KARL H. AXLINE
Attesting Officer

ROBERT C. WATSON
Commissioner of Patents